United States Patent [19]

Smith

[11] Patent Number: 5,023,991
[45] Date of Patent: Jun. 18, 1991

[54] ELECTRICAL GUIDE FOR TIGHT TOLERANCE MACHINING

[75] Inventor: Alan B. Smith, Lincoln, Mass.

[73] Assignee: Digital Equipment Corporation, Maynard, Mass.

[21] Appl. No.: 238,868

[22] Filed: Aug. 31, 1988

[51] Int. Cl.$^5$ .................... G11B 5/127; B23Q 17/00; B23Q 15/00

[52] U.S. Cl. ...................................... 29/603; 29/705; 29/707; 51/165 R; 51/281 R

[58] Field of Search ................. 51/165 R, 281 R, 165; 29/602 R, 603, 592 R, 205, 707, 720

[56] References Cited

U.S. PATENT DOCUMENTS

| | | | |
|---|---|---|---|
| 3,821,815 | 6/1974 | Abbott et al. | 360/110.2 |
| 4,014,141 | 3/1977 | Riddle et al. | 51/165 |
| 4,477,968 | 10/1984 | Kracke et al. | 29/603 |
| 4,559,743 | 12/1985 | Kracke et al. | 51/165 |
| 4,675,986 | 6/1987 | Yen | 29/603 |
| 4,689,877 | 9/1987 | Church | 29/603 |

FOREIGN PATENT DOCUMENTS

61-182618 8/1986 Japan.
62-12911 1/1987 Japan.
2128474 9/1983 United Kingdom.

Primary Examiner—Frederick R. Schmidt
Assistant Examiner—Blynn Shideler
Attorney, Agent, or Firm—Fish & Richardson

[57] ABSTRACT

Method and apparatus for determining present machining height during machining of a workpiece includes an analog resistive sensor, a discrete resistive sensor and a resistive integrity sensor. Analog sensor preferably has a plurality of resistive elements. Discrete sensor includes contact break points on resistive legs, each leg having a different resistive value to create a step-wise incremental change in resistance of discrete sensor as contacts are lapped away. Integrity sensor has resistive value in fixed relation to resistive value of discrete sensor such that ratio is indicative of integrity before machining. Invention enables use of electronic lapping guide with electrically conductive lap without shorting out. Discrete sensor value used to determine location of rear plane of analog sensor and analog sensor value used to confirm identity of break point as part of method for determining current lapping height. Formulae disclosed enable computation of lapping height from measured resistances based on a known height of the analog sensor prior to lapping.

20 Claims, 3 Drawing Sheets

ELECTRICAL GUIDE FOR TIGHT TOLERANCE MACHINING

BACKGROUND OF THE INVENTION

The present invention relates to electrical lapping guides for use in machining workpieces to tight tolerances.

Achieving tight tolerances in the machining of workpieces is a demanding endeavor, but nonetheless necessary in many situations. It is of particular interest in the lapping of thin-film magnetic devices, such as magnetic read/write heads. These heads are typically produced employing thin film deposition techniques. In a typical process, a plurality of heads are formed in a grid on a substrate. The substrate is then cut to produce several bars, with one row of heads in a side-by-side relationship on each bar. The pole tips of the head are oriented and extend out toward a first plane of the bar, called the "air bearing surface" (ABS). The extension length of the pole tips of each head toward the air bearing surface defines the "throat height" of such device. Throat height may be adjusted by lapping the first plane of the bar to a required specification. It is preferably to lap throat height down to very tight tolerances in order to establish adequate performance for high-efficiency recording heads.

Figure 1A:
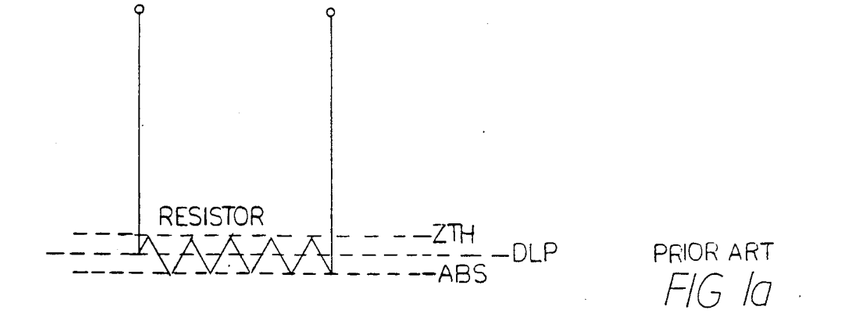
FIGS. 1A, 1B, 1C, 1D are diagrams of three prior art sensor configurations and a prior art two head slider.

It is common practice to use an electrical lapping guide (ELG) during lapping of the air bearing surface of the bar in order to accurately establish throat height. A simple form of ELG is shown in the schematic of FIG. 1a. Here a resistor, such as a uniform resistive layer deposited on the surface of a thin film head wafer, is oriented such that the lower edge of the resistor is parallel with the surface to be lapped (the ABS). Typically, the upper edge of the resistor is located beyond the desired lap plane (DLP) where the lapping process would be desired to terminate, and perhaps extends beyond the zero throat height plane (ZTH).

As lapping proceeds, the resistor will gradually be made narrower with a corresponding increase in its resistance. Where the initial width of the resistor is known, and if its upper edge were accurately located relative to the zero throat height plane, then this simple ELG would give all the information required for controlling the lapping process. Zero throat height is determined by a photoresist layer, but we have found it difficult to pattern the resist layer so that its upper edge is positioned exactly along the zero throat height plane.

Figure 1B:
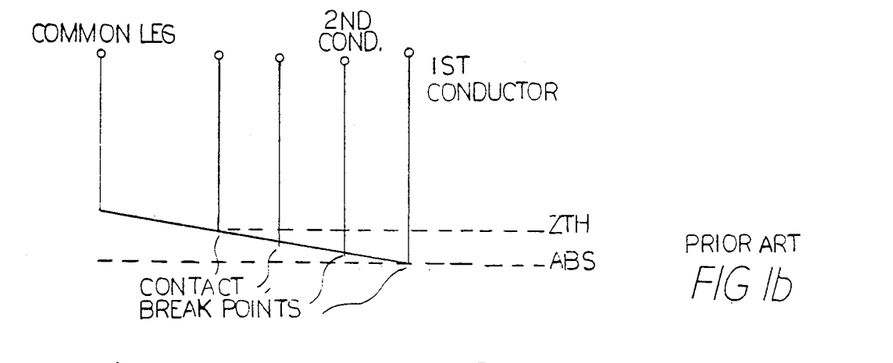

Another type of ELG is shown schematically in FIG. 1b, where one common leg is coupled to four break point conductors, and where each conductor provides an electrical lead for continuity testing with the common leg. These four conductors intersect with the common leg at slightly different positions with respect to the zero throat height plane. This establishes a plurality of "break-points" assigned to respective throat heights. Initially, these conductors are electrically connected. As lapping proceeds, the break point closest to the air bearing surface is the first to be broken. Such breaking is detected by monitoring continuity through the common leg and the first conductor. After further lapping, the second break point is broken, which can be detected by monitoring continuity through the common leg and the second conductor, and so on. By checking for electrical continuity between the various conductors and the common leg, lapping depth can be readily determined.

This latter type of ELG can be made very accurate because the position of each conductivity break point can be determined by a carefully controlled photoresist process. The photoresist can be deposited and patterned at the same time as the first insulation layer, thus positioning the break points accurately with respect to the zero throat height plane.

Figure 1C:
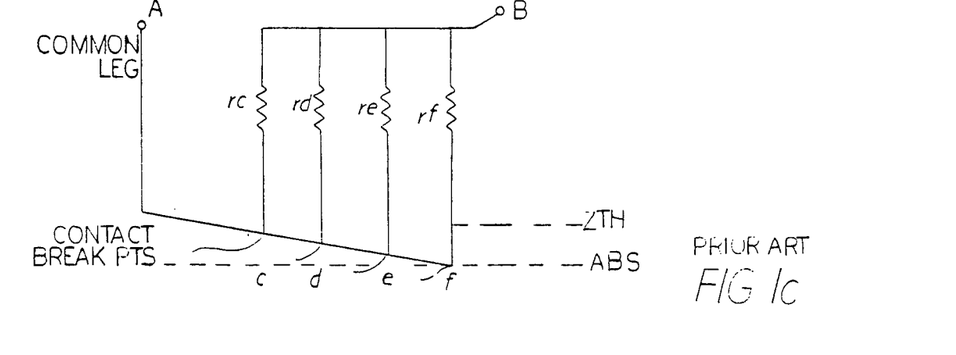

The configuration of FIG. 1b may be rearranged into the structure shown schematically in FIG. 1c. Here, a respective one of four resistors (rc–rf) has been added to each of four break point conductors, where these conductors commonly terminate at one end at a common test point B and are connected at their other ends to the common leg at respectively different positions c–f with respect to the zero throat height plane. The common leg terminates at test point A. In this arrangement, only two leads are required for continuity checking no matter how many break points are used. During lapping, the severing of a break point can be determined simply by detecting a change of resistance between the two test points, A, B. Hence, as lapping of the air bearing surface proceeds, break points c, d, e and f are sequentially broken so as to sequentially and effectively remove resistors rc–rf from the A–B measuring circuit. As a result, as each of the break points is broken, a discrete increase in the measured resistance between leads A, B will be detected. These resistive changes will be indicative of lapping depth into the air bearing surface.

Figure 1D:
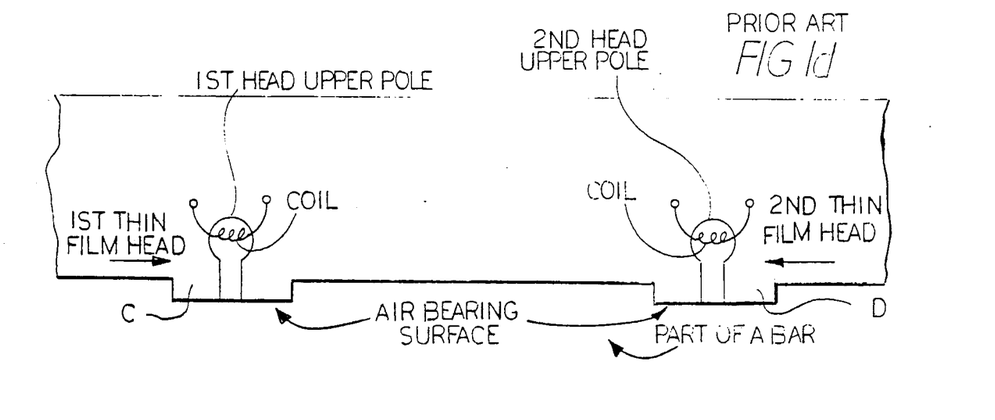

One known configuration of a thin film read/write head includes a first and second thin film head within a single structural unit (called a "slider") which is shown in FIG. 1d. The poles of each head extend into respective "rails" C, D protruding from the bottom of the slider surface. Although not shown, it will be appreciated that a view from the air bearing surface of the slider of FIG. 1d will reveal each thin film head having an upper pole piece P2 and a lower pole piece P1 whose tips are separated by an insulating gap and extend to the air bearing surface. Each head of a two head slider will also be provided with a coil, transducer, or other like device to enable reading/writing during operation of the head. A plurality of sliders will lie side-by-side on a single bar which has been sliced from a wafer during fabrication.

SUMMARY OF THE INVENTION

In general, it is one aspect of the invention that, in lapping the surface of a workpiece to a height above a minimum height plane, which workpiece has an electronic lapping guide having an analog resistive sensor with a near and far plane relative to and substantially parallel to the lapping plane and a discrete resistive sensor having a plurality of contacts each respectively meant to be broken during lapping as a calibration event, present lapping height of the surface during lapping with respect to the minimum height plane can be determined by: determining before lapping a constant K which relates the resistance value Rp of the analog sensor to a known height h of the analog sensor, determining the distance G of the far plane from the minimum height plane upon a first calibration event, and determining present lapped height z with respect to location of the minimum height plane. These determinations may be followed, upon a second calibration event, by measuring a new value of Rp, and by redetermining the present lapped height z from the new value of Rp.

Preferred embodiments of the invention include the following features. Determining constant K includes solving the following equation for K: $Rp = K/h$, determining distance G includes solving the following equation for G: $Rp = K/(z+G)$, and determining height z includes solving the following equation for z: $z = (K/Rp) - G$. Redetermining height z includes solving the following equation for z: $z = (K/Rp) - G$.

It is another general aspect of the present invention that, in lapping the surface of a workpiece to a height above a minimum height plane, which workpiece has an electronic lapping guide having an analog resistive sensor having a height h and a resistance Rp, the analog sensor having a near and a far plane relative to and substantially parallel to the lapping plane, leads associated with the analog sensor having a series resistance Rs, where $Rp' = Rp + Rs$, the workpiece also having a discrete resistive sensor of resistance Rb with a plurality of contacts each respectively meant to be broken during lapping as a calibration event, the sensors coupled to each other at respective ends at a test point, a current value of lapping height z can be calculated by: measuring the resistance Rp'(at time O) before lapping (at a known height h), lapping until a first calibration event is detected and measuring Rp'(at time 1) at a known height $z_1$, lapping until a second calibration event is detected and measuring Rp'(at time 2) at a known height $z_2$, simultaneously solving for G, K, Rs the following equations:

$$Rp(0) = K/h + Rs,$$

$$Rp(1) = K/(z1 + G) + Rs,$$

$$Rp(2) = K/(z2 + G) + Rs,$$

and calculating a current value of lapping height z, using the currently read value of Rp'(at time current) and the value of G, K and Rs determined above, by solving the following equation for $z_{current}$:

$$z_{current} = K/(Rp'_{current} - Rs) - G.$$

It is another general aspect of the present invention that, in using an electronic machining guide which has an analog resistive sensor Rp and a discrete resistive sensor Rb, the analog sensor having a far plane and a near plane, the planes parallel to a plane to be machined to a desired height relative to a minimum height plane, the discrete sensor Rb having a plurality of discrete contact points, each of the contact points having a known calibrated location with respect to the minimum height plane, location of the far plane can be calibrated with respect to the minimum height plane by reference to location of at least one of the contact points, and identify of at least one of the contact points by reference to the value of Rp can be validated, by monitoring the value of Rb, using an increase in the value of Rb to indicate a substantial breaking in the continuity of the at least one contact point, using the known location of the contact point to determine location of the far plane with respect to the minimum height plane, monitoring the value of Rp, and using an increase in the value of Rp to validate identity of at least one of the contact points.

It is another general aspect of the present invention that in using an electrically conductive lap on a workpiece with an electronic lapping guide, a voltage is applied through the guide to determine lapping progress and to limit the voltage to a value that does not substantially short out to the lap. Such voltage is preferably less than 700 millivolts.

Preferred embodiments of the invention include the following features. An electronic machining guide for determining present machining height during machining of a workpiece to a desired height includes: an analog resistive sensor, a discrete resistive sensor, a plurality of parallel connected resistive elements in the discrete sensor, the elements having assigned different resistive values and having a combined resistive value Rb, one end of each element coupled to a common point and the other end of each element separately coupled to a common conductor at respective spaced-apart contact points, whereby breaking of continuity of at least a first of the contact points will cause the resistive value Rb to increase approximately by a predefined increment, and each sensor coupled to each other whereby present machining height can be determined. The analog sensor includes a series resistance having at least a first and a second resistive segment and a conductor, the first segment serially connected to the second segment via the conductor, the segments each having a first edge and a second edge, the second edge substantially parallel to the first edge, the segment first edges lying substantially in the same plane at least after machining, and the segment second edges lying substantially in a same other plane, and the sensor providing resistive readouts from which present machining height during machining can be determined. The series resistance further comprises a third resistive segment and a second conductor, the third segment connected to the second segment via the second conductor. The discrete sensor includes, e.g., five elements and the predefined increment is about 50%. A guide also includes an integrity sensor coupled to and enabling independent integrity testing of the discrete sensor before machining. The integrity sensor has a resistive value R, whereby the ratio of R/Rb is indicative of the integrity of the discrete sensor.

Other preferred embodiments include the following features. A layered apparatus having a surface to be lapped down to a desired height plane relative to a minimum height plane incorporates in electronic lapping guide and includes: a special station, an analog resistive sensor and a discrete resistive sensor associated with the special station, circuitry enabling reading of the resistance of each sensor, the analog sensor having a near and a far plane, the near plane disposed at a known height parallel and adjacent to the surface to be lapped, the discrete sensor having discrete parallel-resistive indicator legs respectively defining break points hierarchically positioned within the apparatus at different calibrated heights with respect to the minimum height plane, whereby the identity of the break points and the current height of the surface to be lapped with respect to the minimum height plane are discernible from the read resistance of the sensors.

A first station is located at the surface to be lapped, the special station being associated with the sensors and configured to lap at approximately the same rate at which the first station laps. A second station is included, and the first, the second and the special stations include, respectively, a first rail, a second rail and a third rail, each rail prior to lapping protruding from the apparatus at the surface to be lapped, at least a portion of the guide located within the third rail. First and second transducers are included, wherein the first and second rails are associated with the first and second transducers, respectively, and wherein the apparatus further includes multiple photoresist layers common to the transducers and the guide. The guide may include at least one feature whereby the photoresist formation is analogous in each of the rails. A resistive integrity sensor is included for checking the integrity of the discrete sensor before lapping. Preferably the integrity sensor has a resistive value R, whereby the ratio of R to the resistive value Rb of the discrete sensor is indicative of the integrity of the discrete sensor.

An electronic lapping guide on a slider, the slider having two transducers each providing at least two operational electrical leads, and further includes five test pads, the at least two leads each respectively electrically coupled to a respective one of four of the pads, the guide electrically coupled respectively to each of the five pads.

Other advantages and features will become apparent from the following description of the preferred embodiment and from the claims.

DESCRIPTION OF THE PREFERRED EMBODIMENT

We first briefly describe the drawings.

Figure 2:
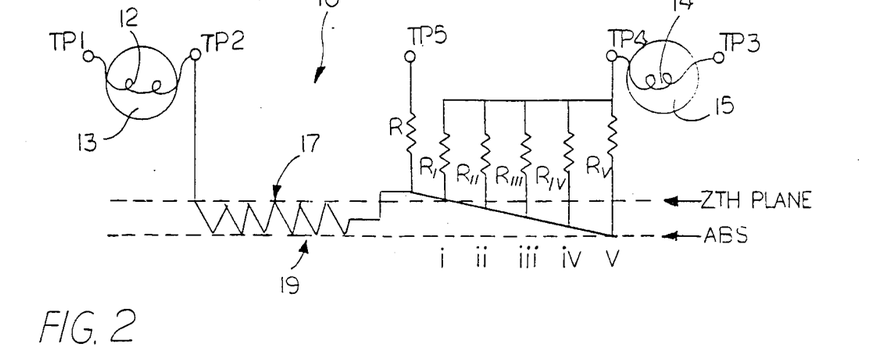
FIG. 2 is a schematic diagram of an ELG.

Turning now to FIG. 2, a preferred ELG 10 incorporation a coil 12 of a first thin film head 13, where a first lead of coil 12 terminates at a first test point TP1. The other end of coil 12 is connected to a second test point TP2, and is also connected to the first end of a resistor $R_p$. Resistor $R_p$ lies parallel to the device air bearing surface and the zero throat height plane, where the near edge 19 of resistor Rp is by the air bearing surface and the far edge 17 of resistor Rp lies adjacent and slightly beyond the zero throat height plane. Resistor $R_p$ provides an analog lapping sensor analogous to the sensor of FIG. 1a. The other end of resistor $R_p$ is coupled to a third test point TP5 via resistor R and is also coupled to test point TP4 via the parallel resistive circuit Rb. Resistive circuit Rb includes five parallel resistors $R_i$–$R_v$. This parallel circuit is analogous to that seen in FIG. 1c, but where five contact points i–v are located at assigned depths in the third rail (shown in FIG. 3) between the air bearing surface and the zero throat height plane. Coil 14 of a second thin film head 15 is connected between test points TP3 and TP4.

Figure 3:
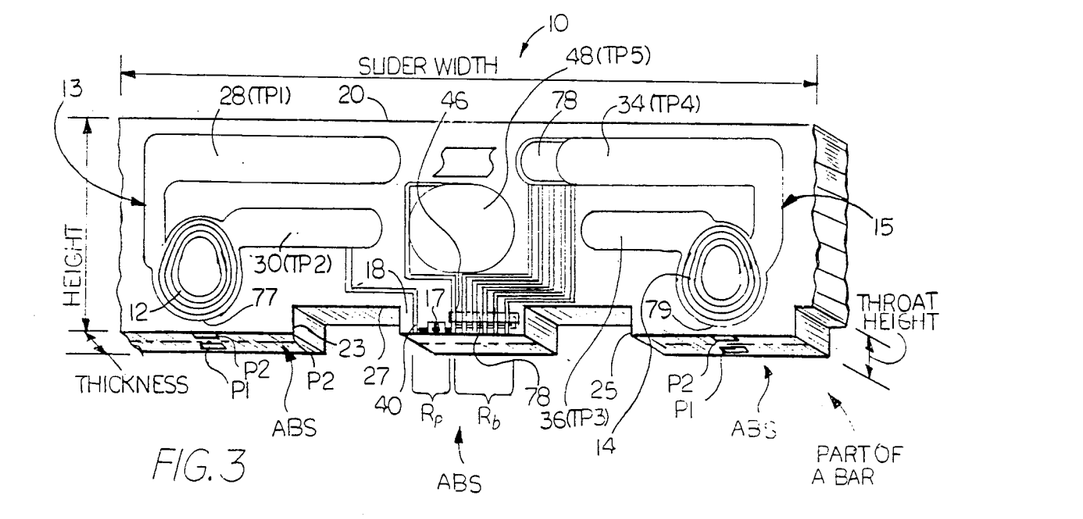
FIG. 3 is a diagram of the ELG circuit 10 of FIG. 2 shown in a top plan view of a slider 20.

The present ELG invention is incorporated into a two head 13, 15 slider zo (such as one of a series of side-by-side sliders on a bar) in the region of a third rail 18, as shown in FIG. 3. Although not shown, it will be appreciated that the tips of the pole pieces, P1, P2 of heads 13 and 15 extend out to the air bearing surface of the bar at rails 23 and 25, respectively. Coil 12 of thin film head 13 terminates at bonding pads 28, 30. Coil 14 of thin film head 15 terminates at bonding pads 34, 36.

Figure 4:
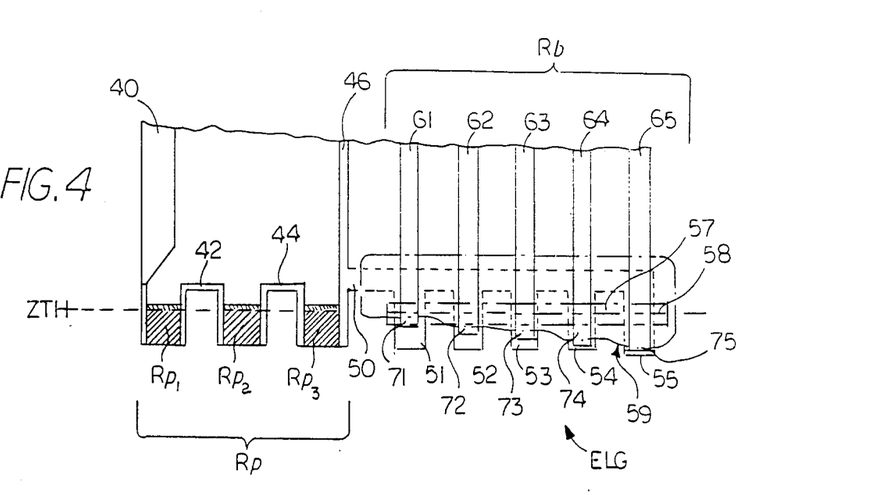
FIG. 4 is a diagram of the ELG circuit 10 within rail 18 of slider 20 of FIG. 3.

That portion of the invention which is incorporated within rail 18 in FIG. 3 is more particularly shown in FIG. 4. Therefore, by reference to FIGS. 3 and 4, in conjunction with reference to FIG. 2, it will be appreciated that a series resistor Rp coupled to a parallel resistor Rb are provided at rail 18 in a multisection laminated structure. The first lead 40 of resistor Rp is coupled to bonding pad 30 via conductor 27. The second lead 46 of resistor Rp is connected to bonding pad 48; this second lead has a resistor value and is represented as resistor R in FIG. 2. A common leg 50 of parallel resistor network Rb is also coupled to pad 48 via resistor R.

Resistor Rp includes three serially coupled resistive sections $Rp_1$, $Rp_2$, and $Rp_3$. Lead 40 is connected to the outer end of resistive section $Rp_1$. The other end of resistive section $Rp_1$ is coupled to one end of resistive section $Rp_2$ via conductor 42. The other end of resistive section $Rp_2$ is coupled to the adjacent end of resistive section $Rp_3$ via conductor 44. The outer end of resistive section $Rp_3$ is connected to resistor R at lead 46.

Resistor Rb includes five parallel resistive strips 61–65 running at right angles over and insulated from Rb common leg 50, separated by insulator strip 58. However, each of the tips of strips 61–65 are electrically joined to fingers 51–55 of common leg 50 at contact break points 71–75, respectively. Strips 61–65 extend from rail 18 into the slider 20 and terminate at a conductive lead 78 which in turn is connected to bonding pad 34.

ELG 10 is a multilayer device and is created at the same time that other functional structures of slider 20 are being formed on-wafer. In particular, it is known in thin film head processing that the first pole of heads 13, 15 each are simultaneously deposited with a thin seed layer and then plated with a thick permalloy layer. In practice of the present invention, a seed component of legs 40, 46, 50 (including fingers 51–55), conductors 42 and 44, and resistive sections $Rp_1$–$Rp_3$, is first etched in the seed layer. (The seed layer might be a 0.2 micron thick layer of permalloy seed material). Thereafter, an additional permalloy layer, such as 2.8 microns thick, is plated over the seeded pattern described above except that the resistive sections $Rp_1$, $Rp_2$, and $Rp_3$, are not further plated, although they may be capped later with a suitable insulator such as $Al_2O_3$. (Resistor Rp is divided into a plurality of thin resistive segments to avoid the tendency of a longer and thicker strip to delaminate.)

The five finger 51–55 are covered with a photoresist insulative layer 58. This layer is patterned in a step-wise configuration, whereby successive lappings at the air bearing surface of slider 20 will cause break points 75–71 to open in a serial fashion, beginning with break point 75 and ending with break point 71 as the air bearing surface is lapped down toward a desired throat height.

A "dummy coil" structure 57 may be incorporated into resistor Rb so as to effectively configure ELG 10 like the pole tips of heads 13, 15 and so as to provide a mechanical aid in formation of resistor Rb. In particular, dummy 57 causes the photoresist of layer 58 to locate at edge 59 of layer 58 in a fashion consistent with photoresist formulation at the pole tips of the heads 13, 15. Dummy 57 may be made of copper or other suitable material so that it will lap at its section 78 at about the same rate as the sections of first turn 77, 79 of coils 12, 14 of heads 13, 15, respectively. Hence, layer 58 preferably is comprised of the same number of photoresist layers and material as in heads 13, 15, where "dummy coil" 57 is embedded within layer 58 so as to provide uniform lapping across the air bearing surface. This uniformity of configuration is indicated by the location of sections 77, 78, 79 and by the dotted line across the rail faces at the air bearing surface, as shown in FIG. 3.

Resistive conductors 61-65 are plated at the same time as plating of the second pole of heads 13, 15. These permalloy conductors are made both long and narrow so as to achieve their desired resistive values.

In the embodiment described above, each resistive segment $Rp_1-Rp_3$ of Rp is preferably 25 microns long and 20 microns wide. Assuming that the seed layer is 0.2 microns thick and that the seed and permalloy layer have the literature values of resistivity, the Rp resistance calculates to be three ohms. (However, the actual Rp resistance may be higher since resistivity may be higher than the literature value and additional resistance may be registered in the thick-permalloy conductors 40, 42, 44, 46.)

The five resistors (Ri-Rv) of resistor Rb each have different resistances. The widths of the conductors 61-65 thus should be adjusted so that, reading from right to left in FIG. 2, resistors Rv-Ri (i.e., conductors 65-61 in FIG. 4) have the following resistive values: 2.8, 4.2, 5.8, 8.9, and 4.5 ohms. These values have been chosen so that there will be approximately a 50% change in resistance as each breakaway occurs. Before lapping begins and if all five resistors are connected, the total resistance is about 0.91 ohms. When the first finger 55 is severed from conductor 65 at contact point 75, the resistance Rb increases to about 1.34 ohms. When the second finger 54 is severed at contact point 74, resistance Rb increases to about 1.97 ohms. As the third contact point 73 is broken, resistance Rb climbs to about three ohms. When contact point 72 is opened, resistance Rb is measured at about 4.5 ohms. The opening of the last contact point 71 results in an infinite reading.

FIG. 2 shows another resistance which is not been previously discussed in detail. That is the resistance R which in of FIG. 4 is formed as part of leg 46 and has a nominal value of about 9.3 ohms. This resistance is created by making leg 46 a long thin path to pad 48 to which it is connected. Resistor R is fabricated at the same time as resistor Rb, i.e., it is made in the same permalloy plating step as when the second pole is formed. Thus the ratio of Rb to R should always be the same slider to slider if all the resistor Rb elements are intact. Resistor R has been provided so that this ratio can be measured as a continuity check on the resistive elements of resistor Rb. Thus R/Rb is measured on wafer to insure that there are no defects in the elements of resistor Rb that could cause the ELG to give erroneous values of throat height during lapping.

Figure 5:
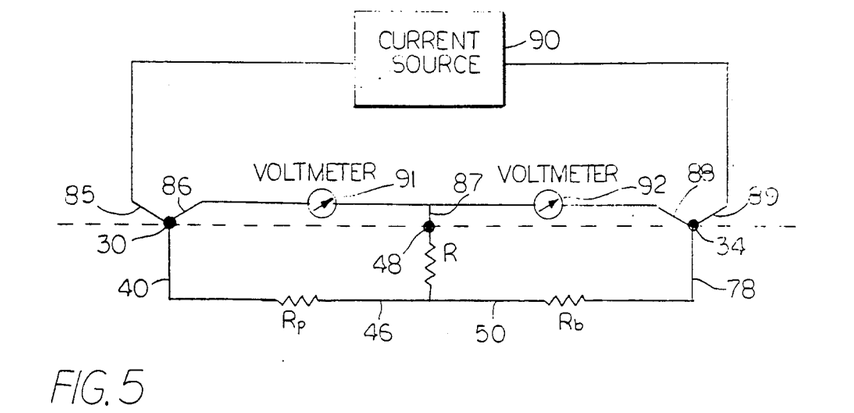
FIG. 5 is a schematic diagram of a four probe measurement technique.

Successful lapping under ELG control depends on being able to accurately measure resistances Rb and Rp. This measurement is complicated by the fact that the resistances are rather low. In fact, they are not much larger than the contact and lead resistances involved in the measurement. In order to remove the effects of these extraneous resistances, a "four-probe" measurement must be made for each resistance Rp or Rb. Since Rp and Rb will both be measured during lapping, five probes will be needed. In FIG. 5, five probes 85-89 are shown, where probe 85 connects on side of current source 90, and probe 86 connects one side of voltmeter 91, to leg 40 of resistor Rp via pad 30 (TP2). Probe 87 connects the other side of voltmeter 91 to the other leg 46 of resistor Rp via pad 48 (TP5) and resistor R and to the common leg 50 of resistor Rb. Probe 89 connects the other side of current source 90, and probe 88 connects one side of voltmeter 92, to one leg 78 of resistor Rb via contact pad 34 (TP4). The other side of voltmeter 92 is similarly coupled via probe 87 to resistors Rp, R and Rb via pad 48 (TP5). Alternatively, probe 85 may be connected to leg 40 via pad 28 (TP1) and coil 12, and probe 89 may be connected to leg 78 via pad 36 (TP3) and coil 13, whereby only a single one of the five probes need be connected to a single respectively assigned contact pad test point.

It will be appreciated, however, that voltmeters 91 and 92 might be replaced with a single instrument in an appropriately multiplexed arrangement. Nevertheless, the value of Rp is obtained from one voltage reading and the value of Rb from another. Neither reading is affected by the presence of R, since it is a known constant and can be disregarded. Since the resistor R is only used for an on-wafer check of finger integrity, as described above, if does not have to be measured during lapping.

A potential problem with the measurement of resistor Rp is that one edge of this resistor is exposed at the surface being lapped. Likewise, the ends of fingers 51-55 and of conductors 61-65 are similarly exposed. Since the lap is copper, one would think that the resistances would be shorted out, thus preventing accurate measurement during lapping. Fortunately, this shorting out can be avoided by using very small voltages because the presence of oil and diamond grit on the lap provides an effective insulating layer to very small voltages. We have noted some leakages to the lap where the voltage was greater than 700 millivolts, however. Thus, it is preferable to limit measuring voltages to values below 700 millivolts, perhaps even at or below about 100 millivolts.

In order to make the four-probe resistance measurements on the ELG's during lapping, we need a stable current source and accurate voltage measuring circuitry. We have found that a constant current is conveniently provided by an isolated power source through an LM134-type integrated-circuit current regulator.

In order to make the accurate voltage measurements that are required, we have chosen a commercial instrumentation module that is specially designed for measuring small voltages. This module, a Datel SDAS-8, measures any of eight inputs according to external digital commands. When the measurement is made, the voltage expressed in digital form appears at the output of the SDAS. Unlike other modules that are available to perform this function, the Datel has very low values of drift and excellent isolation between inputs. This latter characteristic is important since the module is connected to several different ELG's. Without adequate isolation, the voltage measurement obtained for one ELG would be affected by the voltages present on all the others. Another advantage of the SDAS is that it provides a differential measurement of voltage. Thus several ELG's can be connected in series and the voltage drop across one ELG can be measured without being affected by the voltage drops across the other ELGs.

Figure 6:
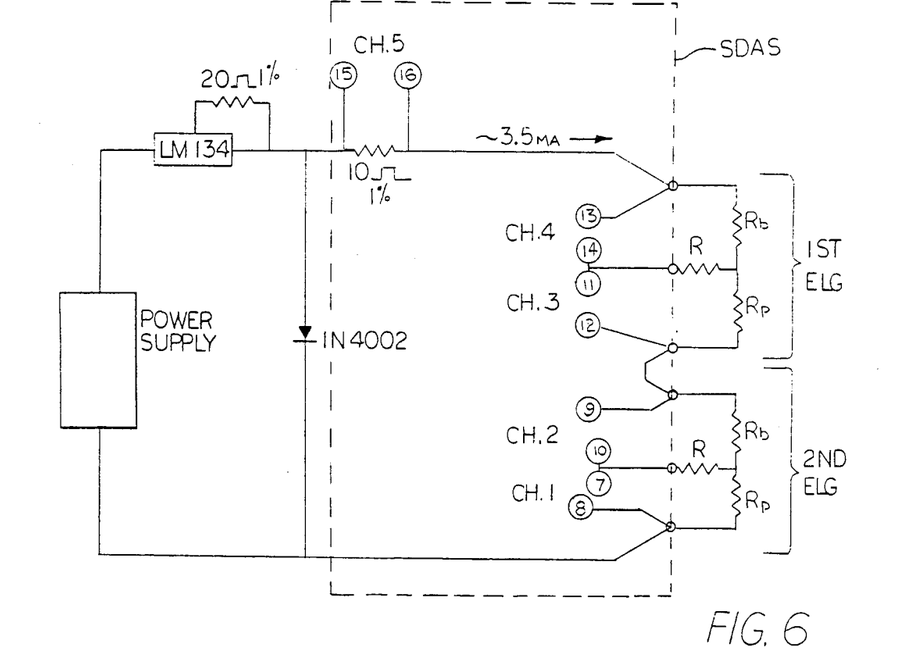
FIG. 6 is a diagram of an ELG monitoring circuit.

FIG. 6 shows measuring device connections for one bar. Note that two channels of the SDAS are used for each ELG, making a total of four used for each bar. Diode 91 is provided to keep voltage applied to the ELG below approximately 700 millivolts. A fifth channel is used to monitor the current by measuring the voltage drop across a precision series resistor Rx. The remaining channels of the SDAS are used for other ELG's on other bars. In our ELG-controlled lapping machine, each "spindle" has four bars to be lapped and three SDAS's to make the measurements.

Figure 7:
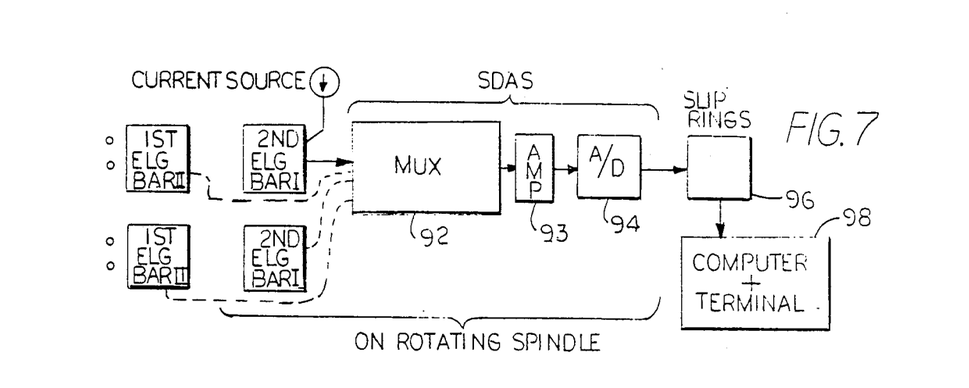
FIG. 7 is a block diagram of an ELG monitoring system.

The voltage readings from the SDAS's do not give the throat height directly. Several arithmetic calculations must be done to obtain this information. These are performed by a host computer, the results possibly being displayed on a terminal. The necessary connections between the SDAS's and the computer must be carried through slip rings since the spindle which carries the pieces to be lapped normally rotates during the lapping process. A block diagram of the arrangement we have used is shown in FIG. 7, where respective pairs of ELG's from respective bars can be conducted through a multiplexer 92, amplifier 93, A/D converter 94 and slip rings 96 to the host computer 98. Note that this arrangement has the advantage that low level signals do not have to be passed through the slip rings. The voltages across the ELG's are digitized by SDAS's mounted on the rotating spindle along with the bars being lapped. It is only the high level digitized output of the SDAS (and power and control signals) that have to travel through the slip rings. Although it is not shown in FIG. 7, additional slip rings are used to return the control signals from the computer to the spindle. These signals control solenoid-operated air valves which determine the amount of pressure applied to each end of each bar being lapped. Thus these pressures can be controlled so as to achieve uniform throat height across the bar. Another solenoid for each bar is actuated to retract the bar from the lapping plate when the desired throat height has been reached. An additional air valve may be used to apply pressure near the center of the bar for extra lapping control. This would be best facilitated by the use of greater than two ELGs per bar.

A basic equation for determining the resistance Rp of sensor Rp is as follows:

$$Rp = PL/A \quad (1)$$

where:
Rp is the resistance,
P is the resistivity of the material from which the resistor is made,
L is the length of the resistor, and
A is the cross-sectional area of the resistor,
If the resistor has a rectangular cross-section, the equation becomes $$Rp = PL/hT. \quad (2)$$

where:
h is the height of resistor Rp, and
T is the thickness of resistor Rp.

In applying equation (2) to resistance Rp, a number of simplifications can be made. The only parameter of P, L, h and T that changes during lapping is height h of resistor Rp as the air bearing surface is lapped away. Therefore, the following equation can be written for Rp:

$$Rp = K/h \quad (3)$$

where K is a constant.

This equation can be rewritten in terms of throat height relative to the position of Rp far edge 17 (shown in FIGS. 2 and 3) which is offset some distance G from the zero throat height plane. This edge is desirably at a nominal 200 microinch offset beyond the zero throat height position. The actual offset distance G varies, of course, from wafer to wafer. Furthermore, if the throat height with respect to the zero throat height plane is represented by the letter z, then $h = z + G$, and then the equation for Rp becomes:

$$Rp = k/(z+G). \quad (4)$$

Inverting this equation, we get:

$$z = k/Rp - G. \quad (5)$$

Equation (5) can be used to determine throat height from the measured values of resistor Rp. In order to make this calculation, however, K and G must be known. The value of K can be determined by measuring the resistance of Rp before the bar is lapped or even before the wafer is cut into bars. The height h of the resistor Rp is known quite precisely since it is determined by the accuracy of the lithographic process. In the above embodiment, this height might be 800 microinches, the lithographic tolerances will certainly be small compared to this figure. Thus, since Rp and h are both known before lapping begins, the value of K can be readily calculated using equation (3). In practice, Rp is measured for each ELG before lapping, and this data is stored by computer 98. The data is later retrieved by the computer to calculate K.

In this embodiment, the lithographic masks are preferably designed so that offset G will be 200 microinches. Since alignment and other tolerances will affect this quantity, this offset is not know exactly for any particular ELG, However, sensor Rb can be used to determine height z above the zero throat height plane, because the relative location of the air bearing surface to the zero throat height plane will be accurately known as soon as lapping progresses to the point where the first breakaway occurs (i.e. when the first contact point 75 is broken), since location of the contact points relative to the zero throat height plane is accurately established in the lithographic process. The lapping-machine computer 98 can then use equation (5) to determine offset G using known values of Rp, K and z. For accuracy, this computation of offset G is repeated at the occurrence of each breakaway. In between breakaways, the computer continually calculates and displays momentary throat height z by using equation (5) and the most recent breakaway value of offset G.

The above procedure compensates for the fact that there is a lead resistance Rs in series with Rp that has been ignored in the above equations. What is actually measured is $Rp' = Rp + Rs$. If necessary, resistance Rs could be included in the equations and evaluated as part of the above process. Such precision may be required for some advanced designs. The above equations 1-5 would be written as follows:

$$Rp' = Rs + PL/A, \quad (1a)$$
$$Rp' = Rs + PL/hT, \quad (2a)$$
$$Rp' = K/h + Rs, \quad (3a)$$
$$Rp' = K/(z + G) + R_s \quad (4a)$$

$$z = \frac{k}{(Rp' - Rs)} - G. \quad (5a)$$

The procedure for applying above equations (1a-5a) includes measuring the resistance Rp'(at time 0) before lapping (at a known height $h_o$), lapping until a first calibration event is detected and measuring Rp'(at time-1; at a known height $z_1$), lapping until a second calibration event is detected and measuring Rp'(at time-2; at a known height $z_2$), simultaneously solving for G, K, Rs the following equations:

$$Rp'(0) = K/H + Rs,$$

$$Rp'(1) = k/(z1 + G) + R_s,$$

$$Rp'(2) = k/(z2 + G) + R_s,$$

and then calculating a current value of lapping height $z_{current}$, using the currently read value of Rp'(at time-current) and the values of G, K and Rs determined above, by solving the following equation:

$$z_{current} = K/(Rp'_{current} - Rs) - G.$$

The computer monitors Rb and decides when a breakaway has been actuated. This process is not quite as simple as it would at first seem. The resistance that sensor Rb will have after each breakaway occurs is not exactly known. But it is known that the resistance value of resistor Rb will increase approximately 50% after each contact point is opened. Furthermore, the break does not occur instantaneously, but gradually over a throat height change of at least several microinches. Hence, a fairly complicated algorithm must be invoked to be certain that the computer never makes a mistake as to which of the contact point is being opened.

The computer must somehow know when the resistance change due to the opening of a contact point has concluded and when any succeeding change is to be attributed to the next resistor break event. As stated above, resistor Rb preferably is designed so that its resistance increases about 50% at each breakaway. The computer is therefore programmed to monitor resistance and to begin to decide that the first breakaway event has occurred if resistance of resistor Rb increases by 25% from its pre-lapping value. In fact, the resistance of Rb will continue to increase until it reaches about 150% of its initial value, but the computer ignores this additional change. After detecting the 25% increase, the computer then monitors the value of throat height z obtained from equation (5). When throat height z changes by half the amount expected to be measured to the next breakaway event, the computer notes the value of Rb. By this time all resistance changes due to the first breakaway event should have been completed. Therefore, the computer can regard this value of Rb (e.g. 1.34 ohms) as a new reference. It then begins to look for a 25% increase in this value. This same process is repeated until the last breakaway event occurs.

The present invention requires at least three contact pads, and preferably five contact pads 28, 30, 36, 34 and 48 corresponding to the five test points TP1-TP5 of FIG. 2, respectively. In any event, it should be appreciated that the present invention requires a single additional contact pad 48 to be added to a two-head slider, or two additional pads in a single-head slider. Hence, since our ELG is formed with minimal added process steps and puts only minimal demand on essential surface areas, an ELG may be fabricated in practice of the present invention within each slider on a wafer with little or no additional overhead.

Other embodiments are within the following claims.

What is claimed is:

1. In a machining process for machining the surface of a workpiece to a height above a minimum height plane, which workpiece has an electronic machining guide having an analog resistive sensor with a near and far plane relative to and substantially parallel to the machining plane and a discrete resistive sensor having a plurality of contacts each respectively meant to be broken during machining as a calibration event, a method for determining present machining height of said surface during machining with respect to said minimum height plane, comprising the steps of:
  (a) determining before machining a constant K which relates the resistance value Rp of said analog sensor to a known height h of said analog sensor, and
  (b) determining present machined height z with respect to location of said minimum height plane in view of constant K.

2. The method of claim 1, further comprising, after step (a) and before (b), the step:
  (a1) determining the distance G of said far plane from said minimum height plane upon a first calibration event, whereby step (b) can be determined in view of both K and G.

3. The method of claim 2, comprising the further steps of:
  (c) upon a second calibration event, measuring a new value of Rp, and
  (d) redetermining the present lapped height z from said new value of Rp.

4. The method of claim 3, wherein:
step (d) includes solving the following equation for z using the new value of Rp:

$$z = (K/Rp) - G.$$

5. The method of claim 2, wherein:
step (a) includes solving the following equation for K:

$$Rp = K/h,$$

step (a1) includes solving the following equation for G:

$$Rp = K/(z + G),$$

and
step (b) includes solving the following equation for z:

$$z = (K/Rp) - G.$$

6. In a machining process for machining the surface of a workpiece to a height above a minimum height plane, which workpiece has an electronic machining guide having an analog resistive sensor having a height h and a resistance Rp, the analog sensor having a near and a far plane relative to and substantially parallel to the machining plane, leads associated with the analog sensor having a series resistance Rs, where $Rp' = Rp + Rs$, the workpiece also having a discrete resistive sensor with a resistance Rb and with a plurality of contacts each respectively meant to be broken during machining as a calibration event, the sensors coupled to each other at respective ends at a test point, a method for calculating a current value of machining height z, comprising the steps of:
(A) measuring the resistance Rp'(at time 0) before machining (at a known height h),
(B) machining until a first calibration event is detected and measuring Rp'(at time 1) at a known height $z_1$,
(C) machining until a second calibration event is detected and measuring Rp'(at time 2) at a known height $z_2$,
(D) simultaneously solving for G, K, Rs the following equations:

$$Rp(0) = K/h + Rs,$$

$$Rp(1) = K/(z1 + G) + Rs,$$

$$Rp(2) = K/(z2 + G) + Rs,$$

and
(E) calculating a current value of machining height z, using the currently read value of Rp'(at time current) and the values of G, K and Rs determined above in step (D), by solving the following equation for $z_{current}$:

$$z_{current} = K/(Rp'_{current} - Rs) - G.$$

7. In using an electronic machining guide which has an analog sensor Rp and a discrete sensor Rb, said analog sensor having a far plane and a near plane, said planes parallel to a plane to be machined to a desired height relative to a minimum height plane, said discrete sensor Rb having a plurality of discrete contact points, each of said contact points having a known calibrated location with respect to said minimum height plane, a method of calibrating location of said far plane with respect to said minimum height plane by reference to location of at least one of said contact points and of validating identity of at least one of said contact points by reference to the value of Rp, comprising the steps of:
(a) monitoring Rb,
(b) using an increase in the value of Rb to indicate a substantial breaking in the continuity of said at least one contact point,
(c) using the known location of said contact point to determine location of said far plane with respect to said minimum height plane,
(d) monitoring the value of Rp, and
(e) using an increase in the value of Rp to validate identity of at least one of said contact points.

8. An electronic machining guide for determining present machining height during machining of a workpiece to a desired height, comprising:
an analog resistive sensor,
a discrete resistive sensor,
a plurality of parallelly connected resistive elements in said discrete sensor,
said elements having assigned different resistive values and having a combined resistive value Rb,
one end of each element coupled to a common point and the other end of each said element separately coupled to a common conductor at respective spaced-apart contact points, whereby breaking of continuity of at least a first of said contact points will cause the resistive value Rb to increase approximately by a predefined increment, and each sensor coupled to each other, whereby present machining height can be determined.

9. The guide of claim 8, wherein said analog sensor includes a series resistance having at least a first and a second resistive segment and a conductor,
said first segment serially connected to said second segment via said conductor,
said segments each having a first edge and a second edge,
said second edge substantially parallel to said first edge,
said segment first edges lying substantially in the same plane at least after machining, and said segment second edges lying substantially in a same other plane, and
said sensor providing resistive readouts from which present machining height during machining can be determined.

10. The guide of claim 9, wherein said series resistance further comprises a third resistive segment and a second conductor, said third segment connected to said second segment via said second conductor.

11. The guide of claim 10, wherein said discrete sensor comprises:
five elements and said predefined increment is about 50%.

12. The guide of claim 11, further comprising an integrity sensor coupled to and enabling independent integrity testing of said discrete sensor before machining, and wherein said integrity sensor has a resistive value R, whereby the ratio of R/Rb is indicative of the integrity of said discrete sensor.

13. The guide of claim 8, further comprising:
an integrity sensor coupled to and enabling independent integrity testing of said discrete sensor before machining.

14. A layered apparatus, having a surface to be lapped down to a desired height plane relative to a minimum height plane, incorporating an electronic lapping guide, comprising:
a special station,
an analog resistive sensor and a discrete resistive sensor associated with said special station,
circuitry enabling reading of the resistance of each of said sensors,
said analog sensor having a near and a far plane, said near plane disposed at a known height parallel and adjacent to the surface to be lapped,
said discrete sensor having differing-valued parallel-resistive indicator legs respectively defining break points hierarchically positioned within said apparatus at different known heights with respect to said minimum height plane, whereby the identity of said break points and the current height of the surface to be lapped with respect to said minimum height plane are discernable from the read resistance of said sensors.

15. The apparatus of claim 14, wherein said apparatus further comprises a first station located at said surface to be lapped, said special station associated with said sensors and configured to lap at approximately the same rate at which said first station laps.

16. The apparatus of claim 15, further including a second station, wherein said first, said second and said special stations comprise, respectively, a first rail, a second rail and a third rail, each rail prior to lapping protruding from said apparatus at said surface to be lapped, at least a portion of said guide located within said third rail.

17. The apparatus of claim 16, further comprising first and second transducers, wherein said first and second rails are associated with said first and second transducers, respectively, and wherein said apparatus further comprises multiple photoresist layers common to said transducers and said guide.

18. The apparatus of claim 17, wherein said guide comprises at least one feature whereby the photoresist formation is analogous in each of said rails.

19. The apparatus of claim 14, further comprising a resistive integrity sensor for checking the integrity of said discrete sensor before lapping.

20. The apparatus of claim 19, wherein said integrity sensor has a resistive value R, whereby the ratio of R to the resistive value Rb of said discrete sensor is indicative of the integrity of said discrete sensor.

* * * * *

UNITED STATES PATENT AND TRADEMARK OFFICE
CERTIFICATE OF CORRECTION

PATENT NO. : 5,023,991

DATED : June 18, 1991

INVENTOR(S) : Alan B. Smith

It is certified that error appears in the above-identified patent and that said Letters Patent is hereby corrected as shown below:

On the Title page, and on drawing sheet 2 of 3:

Substitute Fig. 3, which appears on the first page of the patent and in the Figure Section, as shown on the attached pages.

Col. 10, line 37, change "ELG," to --ELG. --;

Col. 11, line 9, change "Rp' (0)=K/H+Rs," to --Rp' (0)--K/h+Rs,--.

Signed and Sealed this

Twenty-fifth Day of May, 1993

Attest:

MICHAEL K. KIRK

Attesting Officer

Acting Commissioner of Patents and Trademarks

United States Patent [19]

Smith

[11] Patent Number: 5,023,991
[45] Date of Patent: Jun. 18, 1991

[54] ELECTRICAL GUIDE FOR TIGHT TOLERANCE MACHINING

[75] Inventor: Alan B. Smith, Lincoln, Mass.

[73] Assignee: Digital Equipment Corporation, Maynard, Mass.

[21] Appl. No.: 238,868

[22] Filed: Aug. 31, 1988

[51] Int. Cl.$^5$ .............. G11B 5/127; B23Q 17/00; B23Q 15/00

[52] U.S. Cl. .................... 29/603; 29/705; 29/707; 51/165 R; 51/281 R

[58] Field of Search ........... 51/165 R, 281 R, 165; 29/602 R, 603, 592 R, 205, 707, 720

[56] References Cited

U.S. PATENT DOCUMENTS

| | | | |
|---|---|---|---|
| 3,821,815 | 6/1974 | Abbott et al. | 360/110.2 |
| 4,014,141 | 3/1977 | Riddle et al. | 51/165 |
| 4,477,968 | 10/1984 | Kracke et al. | 29/603 |
| 4,559,743 | 12/1985 | Kracke et al. | 51/165 |
| 4,675,986 | 6/1987 | Yen | 29/603 |
| 4,689,877 | 9/1987 | Church | 29/603 |

FOREIGN PATENT DOCUMENTS 61-182618 8/1986 Japan.
62-12911 1/1987 Japan.
2128474 9/1983 United Kingdom.

Primary Examiner—Frederick R. Schmidt
Assistant Examiner—Blynn Shideler
Attorney, Agent, or Firm—Fish & Richardson

[57] ABSTRACT

Method and apparatus for determining present machining height during machining of a workpiece includes an analog resistive sensor, a discrete resistive sensor and a resistive integrity sensor. Analog sensor preferably has a plurality of resistive elements. Discrete sensor includes contact break points on resistive legs, each leg having a different resistive value to create a step-wise incremental change in resistance of discrete sensor as contacts are lapped away. Integrity sensor has resistive value in fixed relation to resistive value of discrete sensor such that ratio is indicative of integrity before machining. Invention enables use of electronic lapping guide with electrically conductive lap without shorting out. Discrete sensor value used to determine location of rear plane of analog sensor and analog sensor value used to confirm identity of break point as part of method for determining current lapping height. Formulae disclosed enable computation of lapping height from measured resistances based on a known height of the analog sensor prior to lapping.

20 Claims, 3 Drawing Sheets